US010949697B2

(12) United States Patent
Hikosaka

(10) Patent No.: US 10,949,697 B2
(45) Date of Patent: Mar. 16, 2021

(54) IMAGE PROCESSING APPARATUS AND IMAGE FORMING APPARATUS

(71) Applicant: KYOCERA Document Solutions Inc., Osaka (JP)

(72) Inventor: Ariyoshi Hikosaka, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 103 days.

(21) Appl. No.: 16/225,644

(22) Filed: Dec. 19, 2018

(65) Prior Publication Data

US 2019/0197336 A1 Jun. 27, 2019

(30) Foreign Application Priority Data

Dec. 26, 2017 (JP) ............................ JP2017-250232

(51) Int. Cl.

| | |
|---|---|
| ***G06K 9/00*** | (2006.01) |
| ***G06K 9/34*** | (2006.01) |
| ***G06K 9/32*** | (2006.01) |
| ***G06F 40/40*** | (2020.01) |
| ***G06F 40/58*** | (2020.01) |

(52) U.S. Cl.

CPC ............ *G06K 9/344* (2013.01); *G06F 40/40* (2020.01); *G06F 40/58* (2020.01); *G06K 9/00456* (2013.01); *G06K 9/3283* (2013.01)

(58) Field of Classification Search

CPC ........ G06K 9/18; G06K 9/3283; G06K 9/344; G06K 9/00456; G06F 17/28; G06F 17/289; H04N 1/00472; H04N 1/00437; H04N 1/00427

USPC ...... 382/182, 181, 211.3; 704/5, 7; 358/1.11

See application file for complete search history.

(56) References Cited

U.S. PATENT DOCUMENTS

2015/0310291 A1* 10/2015 Cuthbert .................. G06K 9/22 382/182
2019/0370339 A1* 12/2019 Kodimer ............ H04N 1/00472

FOREIGN PATENT DOCUMENTS

JP 2004-078672 A 3/2004

* cited by examiner

*Primary Examiner* — Phuoc H Doan
(74) *Attorney, Agent, or Firm* — IP Business Solutions, LLC

(57) ABSTRACT

An image processing apparatus includes a character recognition section, a translation section, an image processing section, a selection acceptance section, and a control section. The character recognition section performs character recognition processing on image data. The translation section translates an original text obtained through the character recognition processing performed by the character recognition section into a predetermined language and creates a translated text. The image processing section generates a replaced image in which a text portion of an original image shown in the image data is replaced from the original text by the translated text. The selection acceptance section accepts an instruction of selecting, as an output target, either one or both of the original image shown in the image data and the replaced image. The control section performs, in accordance with the accepted instruction, processing of outputting an output target image selected as the output target.

3 Claims, 11 Drawing Sheets

IMAGE PROCESSING APPARATUS AND IMAGE FORMING APPARATUS

INCORPORATION BY REFERENCE

This application claims priority to Japanese Patent Application No. 2017-250232 filed on Dec. 26, 2017, the entire contents of which are incorporated by reference herein.

BACKGROUND

The present disclosure relates to image processing apparatuses and image forming apparatuses and particularly relates to a technique of superimposing a text resulted from character recognition processing as a transparent text on image data of a source document.

There is a technique of performing a character search on a source document by performing character recognition processing on an image data of the source document and saving text data resulted from the character recognition processing in association with the image data. In PDF (portable document format) files, for example, a PDF file having a transparent text exists: in the transparent text, the text data is added to image data as the transparent text.

As another example, there is also a technique of performing OCR (optical character recognition) processing on RAW image data being read in from a scanner, translating OCR text data obtained through the processing into another language (for example, from English to Japanese), and integrating the RAW image data, the OCR text data, and a translated text obtained through the translation to output as a PDF file. It is possible to perform a character search in both English and Japanese through the just-mentioned technique.

SUMMARY

A technique improved over the aforementioned technique is proposed as one aspect of the present disclosure.

An image processing apparatus according to one aspect of this disclosure includes a character recognition section, a translation section, an image processing section, a selection acceptance section, and a control section. The character recognition section performs character recognition processing on image data. The translation section translates an original text obtained through the character recognition processing performed by the character recognition section into a predetermined language and creates a translated text. The image processing section generates a replaced image in which a text portion of an original image shown in the image data is replaced from the original text by the translated text. The selection acceptance section accepts an instruction of selecting, as an output target, either one or both of the original image shown in the image data and the replaced image. The control section that performs, in accordance with the instruction accepted by the selection acceptance section, processing of outputting an output target image selected as the output target.

An image forming apparatus according to another aspect of this disclosure includes the image processing apparatus described above and an image forming unit that forms an image on a recording medium. When the selection acceptance section accepts user selection of selecting the both images as the output target, the image processing section creates print data with respect to any of: simplex printing for two pages under which one of the both images is printed on one page and the other one of the both images is printed on the other page; consolidated printing under which the both images are consolidated into one page in form of 2 in 1; and duplex printing under which one of the both images is arranged at a front side of one page and the other one of the both images is arranged at a back side of the one page. By causing the image forming unit to form the output target image containing the both images, the control section performs the processing of outputting.

DETAILED DESCRIPTION

Figure 1:
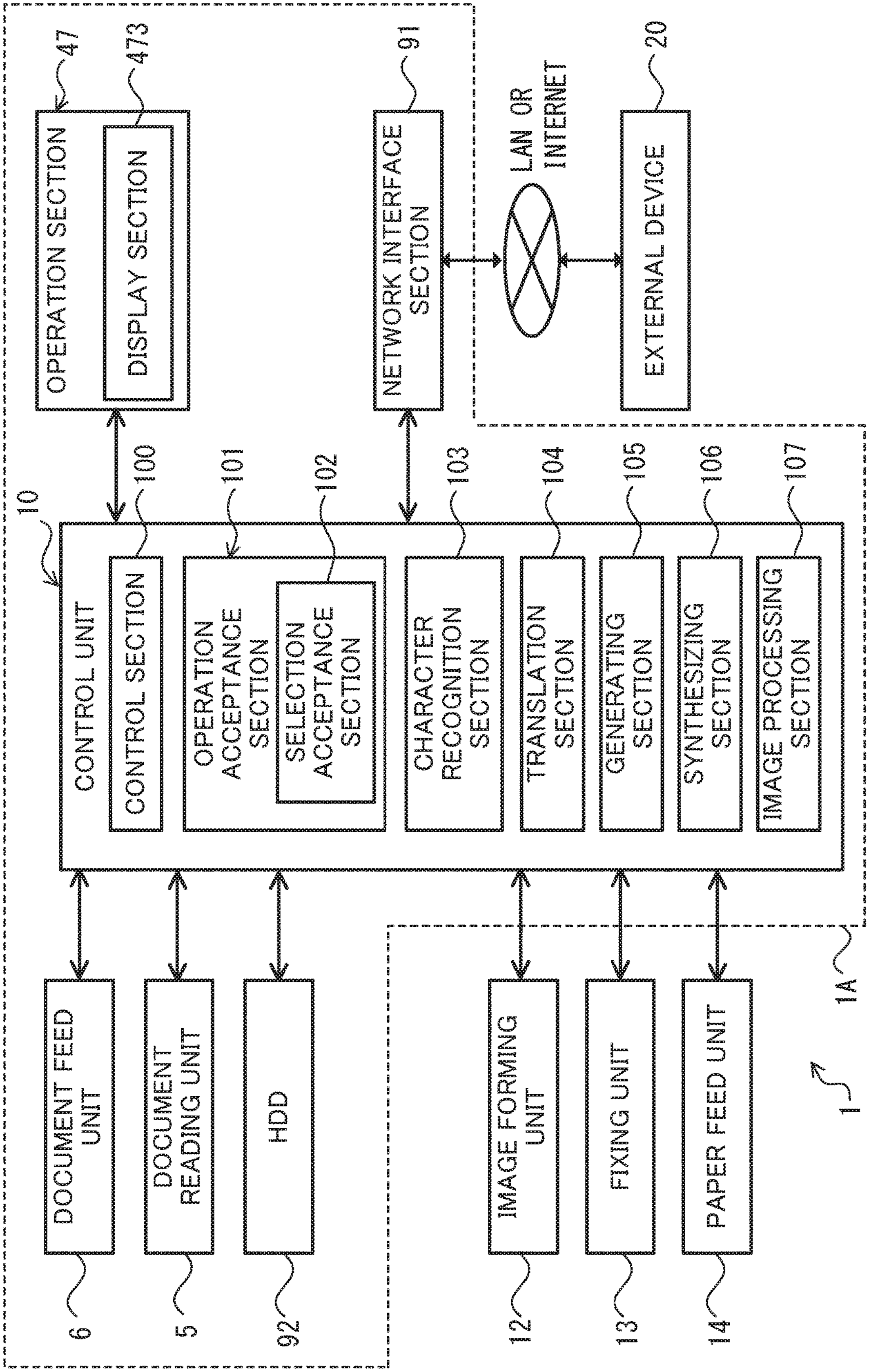
FIG. 1 is a functional block diagram schematically showing an essential internal configuration of an image forming apparatus as an image processing apparatus according to an embodiment of the present disclosure.

Hereinafter, a detailed description will be given of an image processing apparatus and an image forming apparatus according to an embodiment of the present disclosure with reference to the drawings. FIG. 1 is a functional block diagram schematically showing an essential internal configuration of the image forming apparatus 1 as an image processing apparatus 1A according to an embodiment of the present disclosure.

The image forming apparatus 1 a multifunction peripheral having a plurality of functions such as a copy function, a printer function, a scanner function, and a facsimile function. The image forming apparatus 1 includes a control unit 10, a document feed unit 6, a document reading unit 5, an image forming unit 12, an HDD 92, a fixing unit 13, a paper feed unit 14, an operation section 47, and a network interface section 91. The image processing apparatus 1A corresponds to the configuration excluding the image forming unit 12, the fixing unit 13, and the paper feed unit 14 of the image forming apparatus 1 shown in FIG. 1.

Description will be given of the case where the image forming apparatus 1 performs document reading operation. The document reading unit 5 optically reads a source document conveyed from the document feed unit 6 or an image of a source document placed on platen glass, and then generates image data. The image data generated by the document reading unit 5 is saved on, for example, an un-illustrated image memory.

Next, description will be given of the case where the image forming apparatus 1 performs image forming operation. Based on image data such as the image data generated through the document reading operation and the image data received from a computer, which serves as an external device 20, connected to the network, the image forming unit 12 forms a toner image on a recording sheet, which serves as a recording medium, fed from the paper feed unit 14.

The fixing unit 13 fixes the toner image onto the recording sheet through thermal compression. The recording sheet onto which the fixing processing is applied is discharged to an output tray. The paper feed unit 14 has a paper feed cassette.

The operation section 47 receives from an operator for various types of operation and various types of processing executable by the image forming apparatus 1, instructions such as image forming operation execution instruction. The operation section 47 includes a display section 473 that displays, for example, an operation guide to the operator. The display section 473 is formed into a touch panel, which permits the operator to touch buttons and keys displayed on a screen to operate the image forming apparatus 1.

The network interface section 91 performs transmission and reception of various pieces of data to and from the external device 20 such as a PC (personal computer) and a server in a local area or on the Interne. The network interface section 91 is an example of the communication unit in What is claimed is.

The control unit 10 is composed of a processor, a RAM (random access memory), a ROM (read only memory), and an exclusive hardware circuit. The processor is, for example, a CPU (central processing unit), an ASIC (application specific integrated circuit), or an MPU (micro processing unit). The control unit 10 includes a control section 100, an operation acceptance section 101, a character recognition section 103, a translation section 104, a generating section 105, a synthesizing section 106, and an image processing section 107.

The control unit 10, through operation based on a control program installed in the HDD 92, functions as the control section 100, the operation acceptance section 101, the character recognition section 103, the translation section 104, the generating section 105, the synthesizing section 106, and the image processing section 107. However, each of the above-mentioned control section 100 and other sections can be formed of a hardware circuit without depending on the operation performed by the control unit 10 in accordance with the control program. Hereinafter, the same applies to this embodiment unless otherwise specified.

The control section 100 is in charge of overall operation control of the image forming apparatus 1. The control section 100 is connected to the document feed unit 6, the document reading unit 5, the image forming unit 12, the fixing unit 13, the paper feed unit 14, the operation section 47, and the network interface section 91 to perform driving control of these sections.

The operation acceptance section 101 accepts operation input from the user via the operation section 47. Furthermore, the operation acceptance section 101 includes a selection acceptance section 102. Details of the selection acceptance section 102 will be explained later.

The character recognition section 103 performs character recognition processing such as OCR (optical character recognition) processing on RAW image data obtained through the reading by the document reading unit 5 and RAW image data saved on, for example, the HDD 92, and creates original text data (hereinafter referred to as original text as needed) in which a character image contained in the RAW image data is converted into text.

The translation section 104 translates the original text obtained through the processing performed by the character recognition section 103 into a predetermined language (for example English) and creates translated text data (hereinafter referred to as translated text as needed). Execution of a translation application included in the control program enables the translation section 104 to perform the function of the translation.

Based on the RAW image data obtained through the reading by the document reading unit 5, the generating section 105 generates data in a PDF format (hereinafter referred to also as PDF data).

The synthesizing section 106 synthesizes the original text obtained through the processing performed by the character recognition section 103 into the PDF data generated by the generating section 105 as a transparent text and generates the PDF file having the transparent text. Furthermore, the synthesizing section 106 synthesizes the translated text obtained through the translation performed by the translation section 104 into the PDF data.

The image processing section 107 generates a replaced image in which a text portion of an original image shown in the RAW image data obtained through the reading by the document reading unit 5 is replaced from the original text by the translated text.

Figure 2:
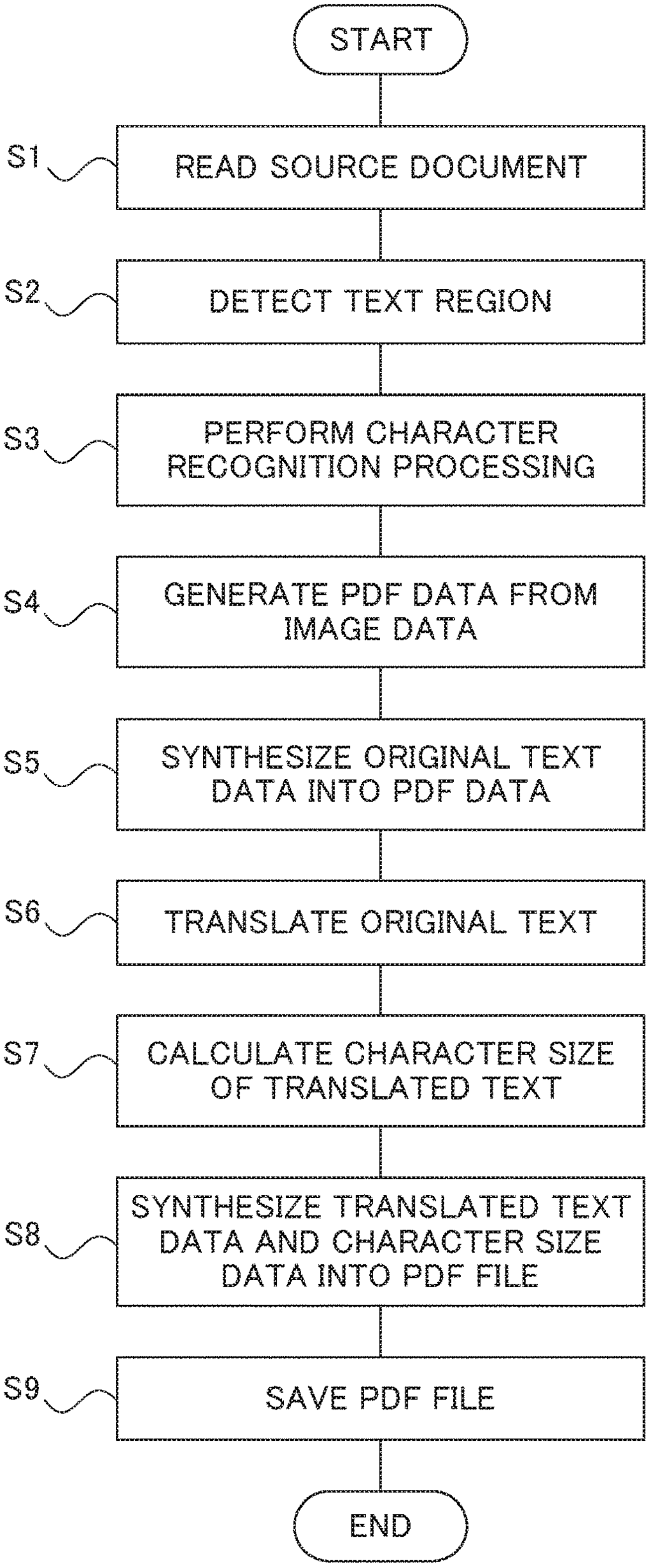
FIG. 2 is a flowchart showing an example of operation processing performed at a control unit of the image forming apparatus as the image processing apparatus according to the embodiment of the present disclosure.
Figure 3:
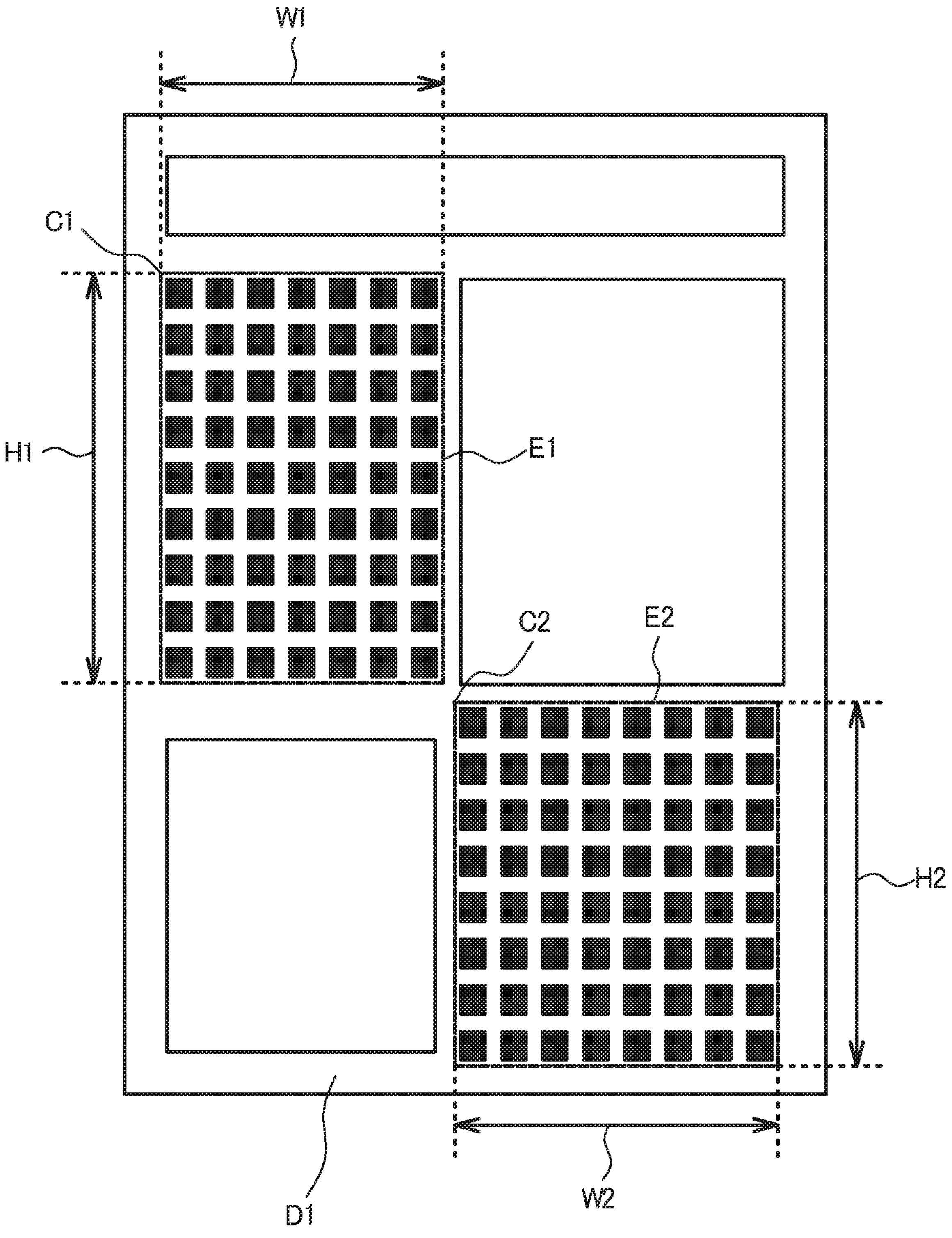
FIG. 3 is a diagram for explaining detection of a text area.
Figure 4:
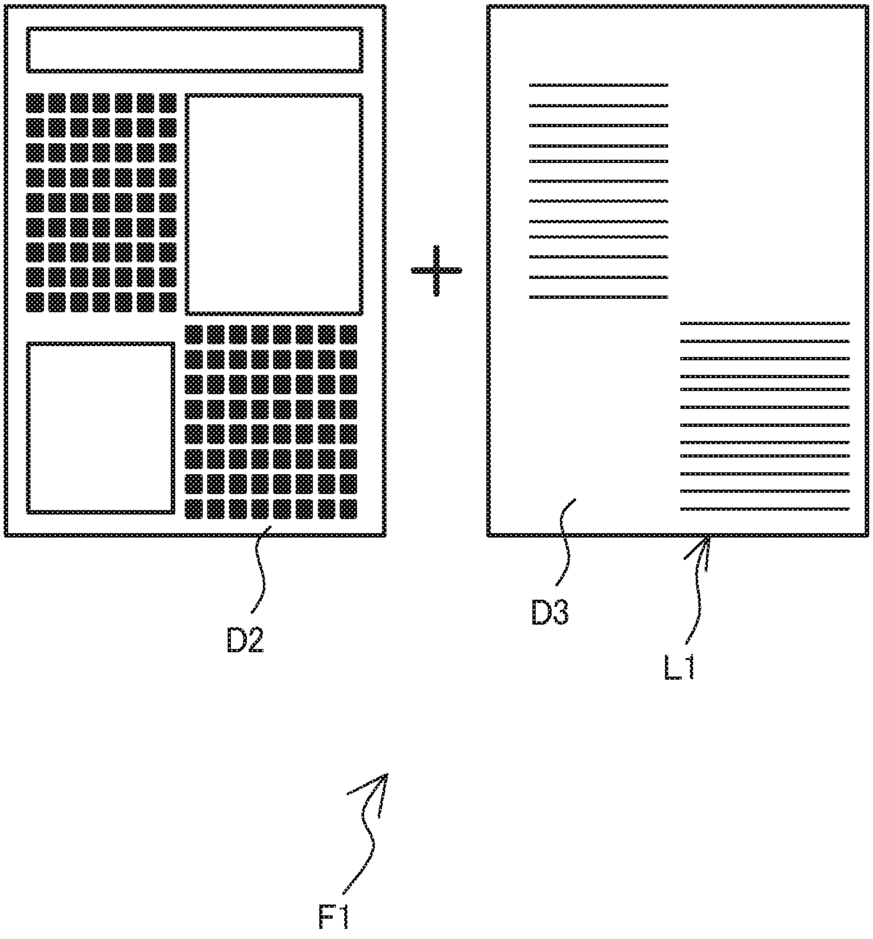
FIG. 4 is a diagram for explaining an example of a hierarchical structure of a PDF file having a transparent text.

Next, with reference to a flowchart shown in FIG. 2, description will be given of an example of operation processing performed at the control unit 10 of the image forming apparatus 1 as the embodiment of the image processing apparatus 1A according to the embodiment with reference to a flowchart shown in FIG. 2. FIG. 3 is a diagram for explaining detection of a text area. FIG. 4 is a diagram for explaining an example of a hierarchical structure of a PDF file having a transparent text.

When the operation acceptance section 101 accepts from the user an instruction to start reading the source document, the control section 100 controls the document reading unit 5 to thereby cause the document reading unit 5 to read the source document (step S1).

Then, based on the RAW image data D1 obtained through the reading by the document reading unit 5 (see FIG. 3), the character recognition section 103 uses a known technique and detects a text region (for example, the upper-left positional coordinate of the bounding rectangle of each region and the width and the height of the bounding rectangle) (step S2). The character recognition section 103 performs the character recognition processing on the RAW image data D1 within the detected text region and creates the text data (step S3).

The generating section 105 uses a known technique and finds, from the RAW image data D1 obtained through the reading by the document reading unit 5, the upper-left positional coordinates C1 and C2, the widths W1 and W2, and the heights H1 and H2 of the RAW image data D1 for each of the text regions E1 and E2. Then the generating section 105 generates PDF data D2 (see FIG. 4) from the RAW image data D1 (step S4).

The synthesizing section 106 synthesizes an original text D3 into the PDF data D2 generated by the generating section 105 as the transparent text so that a character position indicated by the PDF data D2 is arranged at the same arrangement position with a character position shown in the original text D3 obtained through the processing performed by the character recognition section 103 (see FIG. 4) (step S5). The synthesizing section 106 thereby generates a PDF file F1 having the transparent text. As shown in FIG. 4, in the PDF file F1, the PDF data D2 and a first layer L1 are integrated. The original text D3 is embedded in the first layer L1 as the transparent text.

Subsequently, based on the original text D3, the translation section 104 translates a character string (the original text) indicated by the original text D3 into the predetermined language (a language different from the language of the original text) (step S6) to thereby create a translated text D4 (see FIG. 5).

Then the synthesizing section 106 calculates the character size with which an image of a character string shown in the translated text D4 having been obtained through the translation by the translation section 104 can fit within the text regions E1 and E2 (FIG. 3) in a layout of being displayed at the display section 473 or being printed by the image forming unit 12 (step S7).

In the present embodiment, in generating an image for printing or an image for transmission having the translated text D4 arranged in the same layout with the PDF data D2, the image processing section 107 sets the character size of each character image shown in the translated text D4 in a size with which when the translated text D4 is set to be arranged at the same position with the character position indicated by the original text D3, the translated text D4 can fit within the text region E1 or E2 of the original text D3 corresponding the translated text D4.

The synthesizing section 106 synthesizes the translated text D4 and the character size data D5, which indicates the calculated character size, into the PDF file F1 composed of the PDF data D2 and the original text D3 (step S8). The control section 100 saves the PDF file F1 created by the synthesis in the HDD 92 (step S9).

Figure 5:
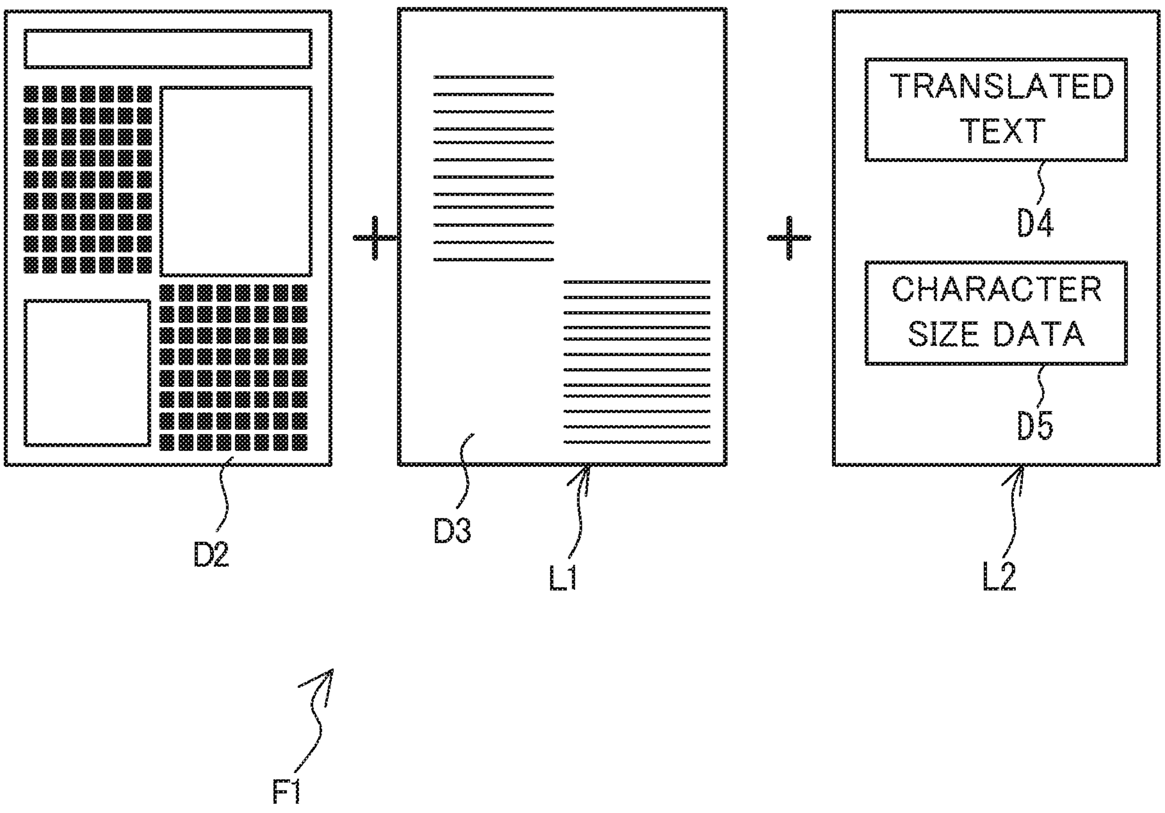
FIG. 5 is a diagram for explaining another example of the hierarchical structure of the PDF file having transparent texts.

FIG. 5 is a diagram for explaining another example of the hierarchical structure of the PDF file having transparent texts. As shown in FIG. 5, the synthesizing section 106 integrates, as the PDF file F1, the PDF data D2, the first layer L1, and a second layer L2. The translated text D4 is embedded in the second layer L2 as the transparent text and the character size data D5 is also embedded therein.

When the original text is translated, if the original text and the translated text are of the same character size, character string length of the original text differs from that of the translated text. For example, when Japanese is translated into English, the character string in English becomes longer than that of Japanese. Therefore, in the case where the translated text is in the same character size with the original text, when the image showing the translated text is laid out to be displayed on the display section 473 or to be printed by the image forming unit 12, the translated text exceeds the size of the text regions E1 and E2. In order to have the image showing the translated text to be fit within the text regions E1 and E2 (see FIG. 3), the synthesizing section 106 calculates the character size with which the image showing the translated text can fit within the text regions E1 and E2 (FIG. 3).

Hereinafter describes processing of outputting when the PDF file F1 is the output target.

<Printing>

Figure 6:
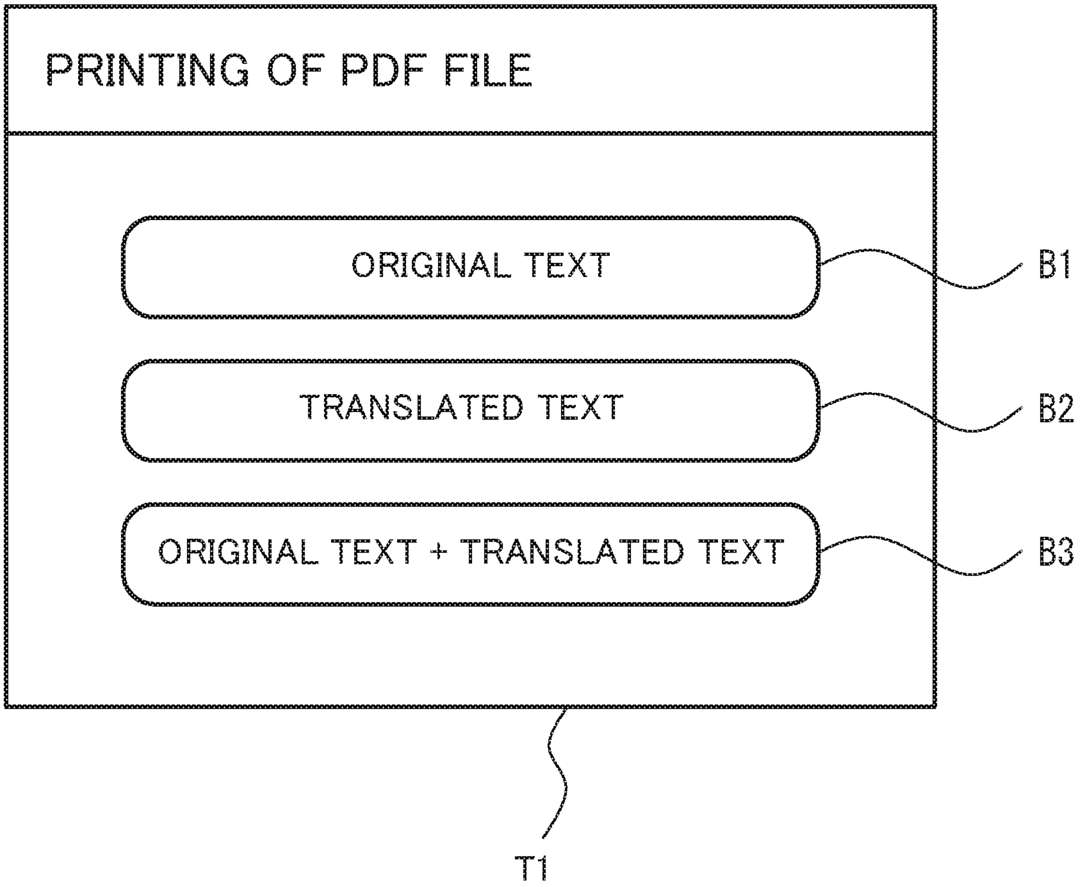
FIG. 6 is a diagram showing an example of an operation screen displayed on a display section.

(1) When the operation acceptance section 101 accepts from the user an instruction to print the PDF F1, the control section 100 causes the display section 473 to display an operation screen T1 as shown in FIG. 6. The operation screen T1 includes selection buttons B1 to B3 formed thereon, and "ORIGINAL TEXT", "TRANSLATED TEXT", and "ORIGINAL TEXT+TRANSLATED TEXT" are displayed on the selection buttons B1 to B3, respectively.

The selection button B1 is for accepting from the user an instruction to select as a print target the original image having the original text. The selection button B2 is for accepting from the user an instruction to select as the print target a translated text image in which as for the text portion the original text is replaced with the translated text. The selection button B3 is for accepting from the user an instruction to select as the print target the both images (the original image and the translated text image).

Figure 7A:
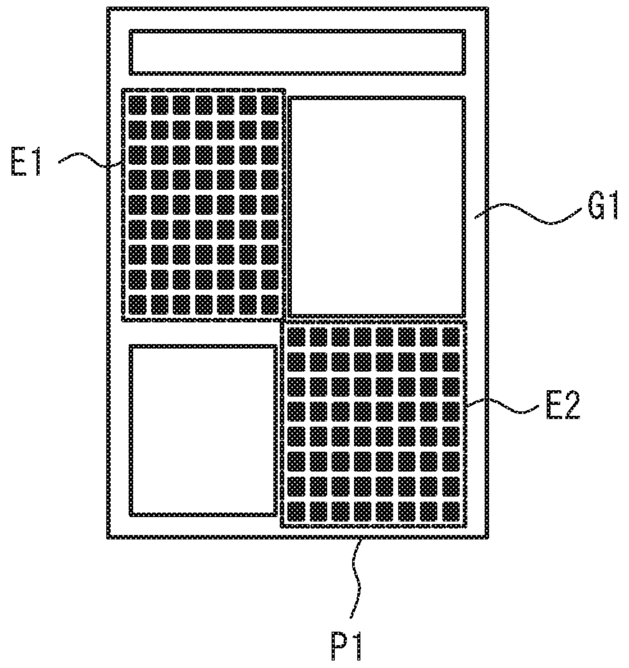
FIG. 7A and FIG. 7B are diagrams each showing an example of a state where an image is being formed on a recording sheet.

(1-1) When the selection button B1 is operated by the user and the selection acceptance section 102 accepts through the touch panel the instruction to select as the print target the original image, as shown in FIG. 7A, the control section 100 uses the PDF data D2 to cause the image forming unit 12 to form on the recording sheet P1 the original image G1 that the PDF data D2 shows.

(1-2) When the selection button B2 is operated by the user and the selection acceptance section 102 accepts through the touch panel the instruction to select the translated text image as the print target, the image processing section 107 generates the image for printing on which the translated text D4 embedded in the second layer L2 is arranged in the same layout with the PDF data D2. At this point, the image processing section 107 sets the position of the translated text D4 to be arranged at the same position with the character position indicated by the original text D3. The image processing section 107 enlarges or reduces the character size of the character image generated on the basis of the translated text D4 in accordance with the character size data D5 embedded in the second layer L2 so that a group of the character image generated on the basis of the translated text D4 can fit within the corresponding.

Then, the image processing section 107 generates the image for printing on which the image showing the translated text created by enlarging or reducing the character size as described above is arranged at the text regions E1 and E2 of the original image shown in the PDF data D2 in place of the original text. The control section 100 uses the generated image for printing and causes the image forming unit 12 to form on the recording sheet P2 a translated text image G2 on which the translated text is arranged at the text portion (the text regions E1 and E2) as shown in FIG. 7B.

Figure 7B:
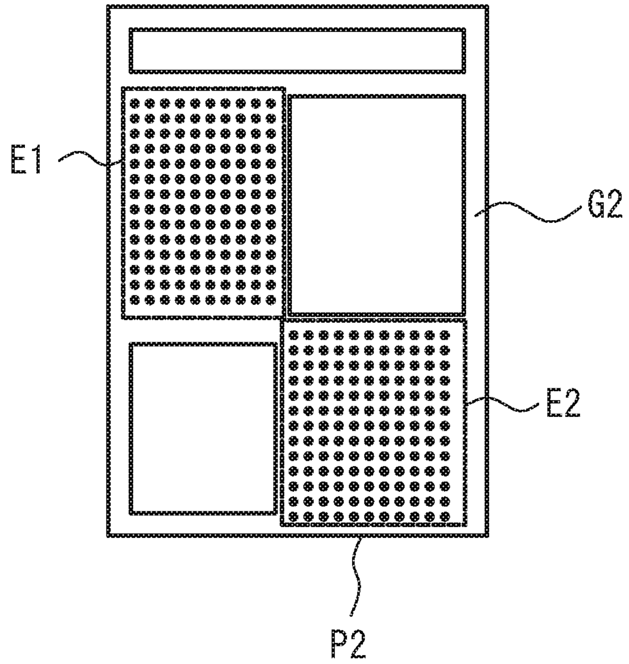

Here, since the translated text fits within the text regions E1 and E2 as the character size is enlarged or reduced as shown in FIG. 7B, the layout of the image remain the same even if the translated text is arranged at the text portion in place of the original text.

(1-3) When the selection button B3 is operated by the user and the selection acceptance section 102 accepts through the touch panel the instruction to select the both images (the original image G1 and the translated text image G2) as the print target, the image processing section 107 generates, in the same manner as the above (1-2), the image for printing on which the image showing the translated text created by enlarging or reducing the character size is arranged, in place of the original text, at the text regions E1 and E2 of the original image shown in the PDF data D2. The control section 100 uses the PDF data D2 and the generated image for printing, and causes the image forming unit 12 to form on the recording sheet P2 the both of the original image G1 and the translated text image G2 on which the text portion has been replaced with the translated text.

Figure 8A:
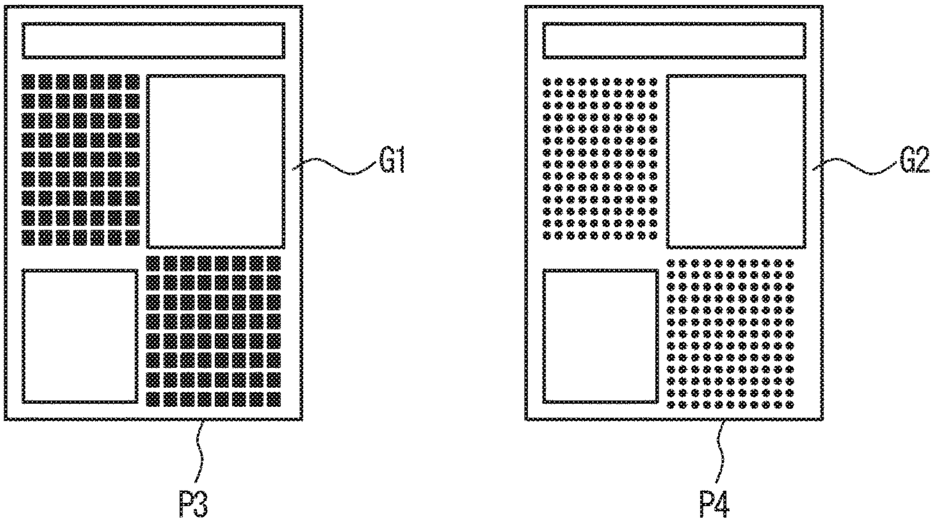
FIG. 8A, FIG. 8B, and FIG. 8C are diagrams each showing an example of a state where an image is being formed on a recording sheet.
Figure 8B:
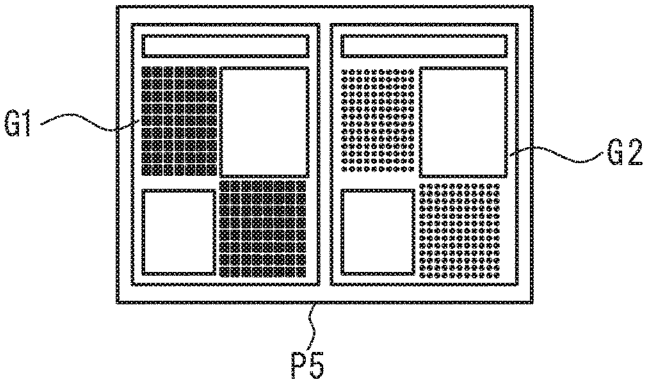
Figure 8C:
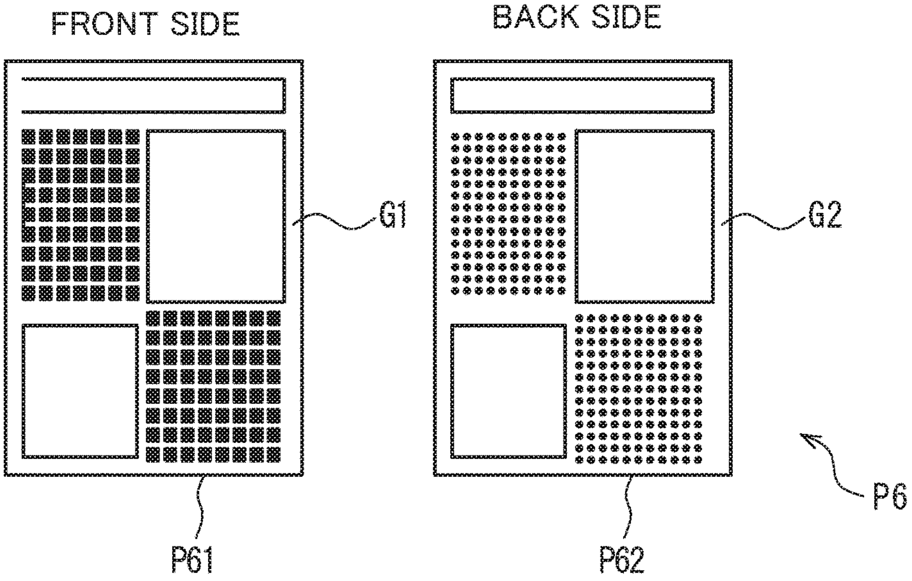

As a mode that the control section 100 causes the image forming unit 12 to form the both images onto the recording sheet, there are, for example: (a) "simplex printing for two pages", as shown in FIG. 8A, under which the original image G1 is printed on the recording sheet P3 and the translated text image G2 is printed on another sheet, i.e., a recording sheet P4; (b) "printing with consolidating on one page in form of [2 in 1]", as shown in FIG. 8B, under which the original image G1 is printed on the left half of a recording sheet P5 and the translated text image G2 is printed on the right half of the same recording sheet P5; and (c) "duplex printing", as shown in FIG. 8C, under which the original image G1 is printed on a front side P61 of a recording sheet P6 and the translated text image G2 is printed on a back side P62 of the same recording sheet P6.

Figure 9:
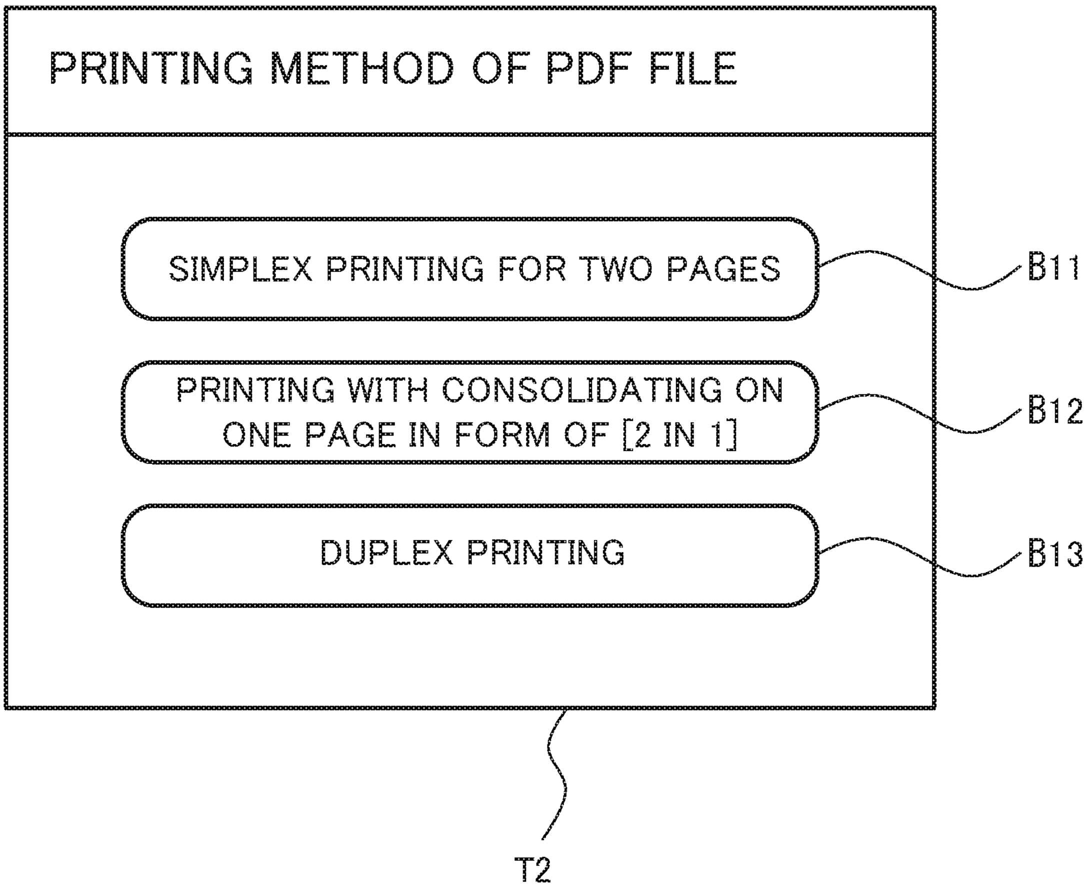
FIG. 9 is a diagram showing an example of the operation screen displayed on the display section.

The control section 100 follows the selection instruction inputted from the user through the operation section 47 and selectively executes any of the above (a), (b), and (c). For example, the control section 100 causes the display section 473 to display an operation screen T2 as shown in FIG. 9 so that the user can arbitrarily select the printing method in accordance with the operation performed on the operation screen T2. The operation screen T2 includes selection buttons B11 to B13 formed thereon: the selection buttons B11 to B13 display "SIMPLEX PRINTING FOR TWO PAGES", "PRINTING WITH CONSOLIDATING ON ONE PAGE IN FORM OF [2 IN 1]", and "DUPLEX PRINTING", respectively.

When accepting operation from the user on any of the selection buttons B11 to B13, the selection acceptance section 102 accepts: based on the operation performed on the selection button B11, the instruction to print two pages by the simplex printing; based on the operation performed on the selection button B12, the instruction to consolidate two pages into one page in form of [2 in] 1 and print; and based on the operation performed on the selection button B13, the instruction to print two pages with the duplex printing. The control section 100 causes the image forming unit 12 to perform image formation (printing) in accordance with content of the instructions received by the selection acceptance section 102.

Figure 10:
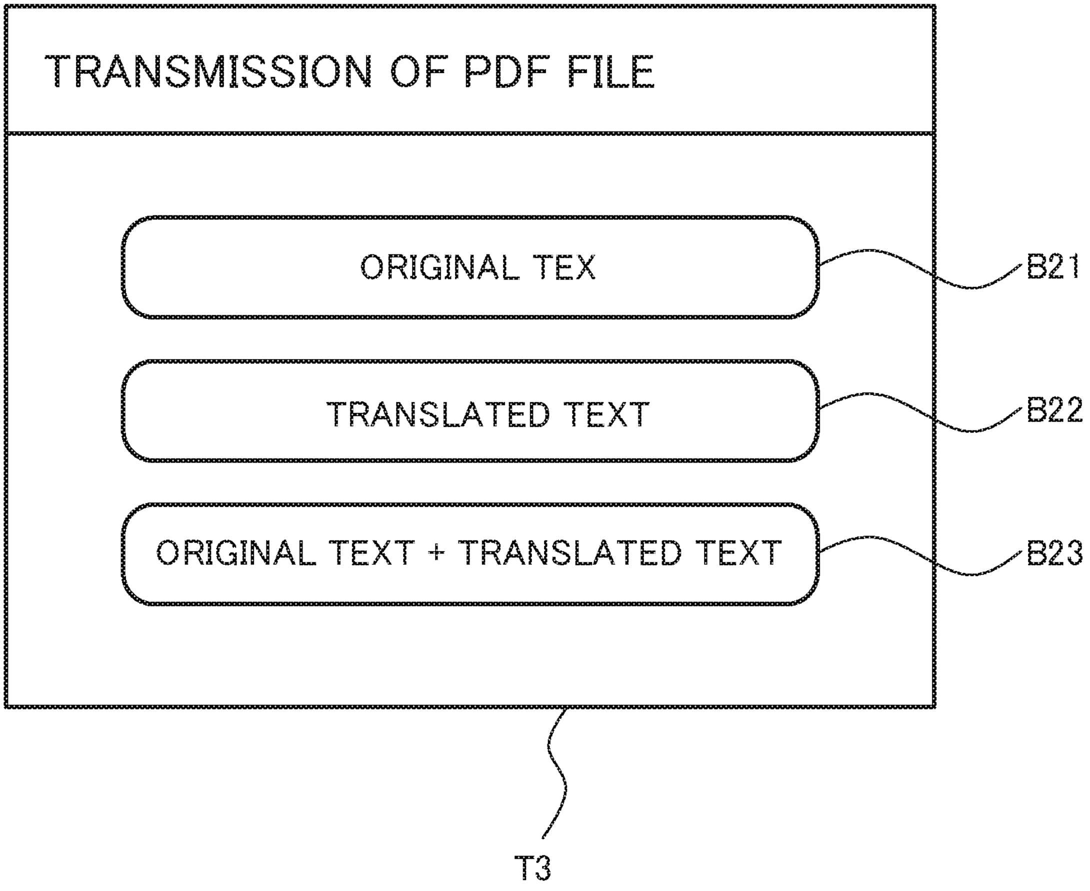
FIG. 10 is a diagram showing an example of the operation screen displayed on the display section.

<Transmission> d(2) When the operation acceptance section 101 accepts from the user the instruction to transmit the PDF file F1 to the external device 20 determined in advance, the control section 100 causes the display section 473 to display an operation screen T3 as shown in FIG. 10. The operation screen T3 includes selection buttons B21 to B23 displayed thereon: the selection buttons B21 to B23 display "ORIGINAL TEXT", "TRANSLATED TEXT", and "ORIGINAL TEXT+TRANSLATED TEXT", respectively.

(2-1) When the selection button B21 is operated by the user and the selection acceptance section 102 accepts through the touch panel the instruction to select the original image G1 as a transmission target, the control section 100 transmits to the external device 20 determined in advance a file including the PDF data D2 (or a file including the PDF data D2 to which a first layer L2 is synthesized) through the network interface section 91.

(2-2) When the selection buttons B22 is operated by the user and the selection acceptance section 102 accepts through the touch panel the instruction to select the translated text image G2 as the transmission target, the image processing section 107 generates, in the same manner as the above (1-2), the image for transmission on which the image showing the translated text D4 created by enlarging or reducing the character size is arranged, in place of the original text, at the text regions E1 and E2 of the original image shown in the PDF data D2. The control section 100 transmits through the network interface section 91 the generated image for transmission to the external device 20 determined in advance.

(2-3) When the selection button B23 is operated by the user and the selection acceptance section 102 accepts through the touch panel the instruction to select the both images (the original image G1 and the translated text image G2) as the transmission target, the image processing section 107 generates the image for transmission on which the translated text created by enlarging or reducing the character size in the same manner as the above (1-2) is arranged at the text regions E1 and E2 of the original image shown in the PDF data D2 in place of the original text. The control section 100 transmits through the network interface section 91 the PDF data D2 and the generated image for transmission to the external device 20 determined in advance.

As a method to transmit the both images (the PDF data D2 and the data for transmission) to the external device 20, there are, for example: (d) "arrange in two pages" under which the original image G1 is arranged in one page and the translated text image G2 is arranged in another one page; and (e) "arrangement with consolidating on one page in form of [2 in 1]" under which the original image G1 is arranged in the left half of one page and the translated text image G2 is arranged in the right half of the same page.

Figure 11:
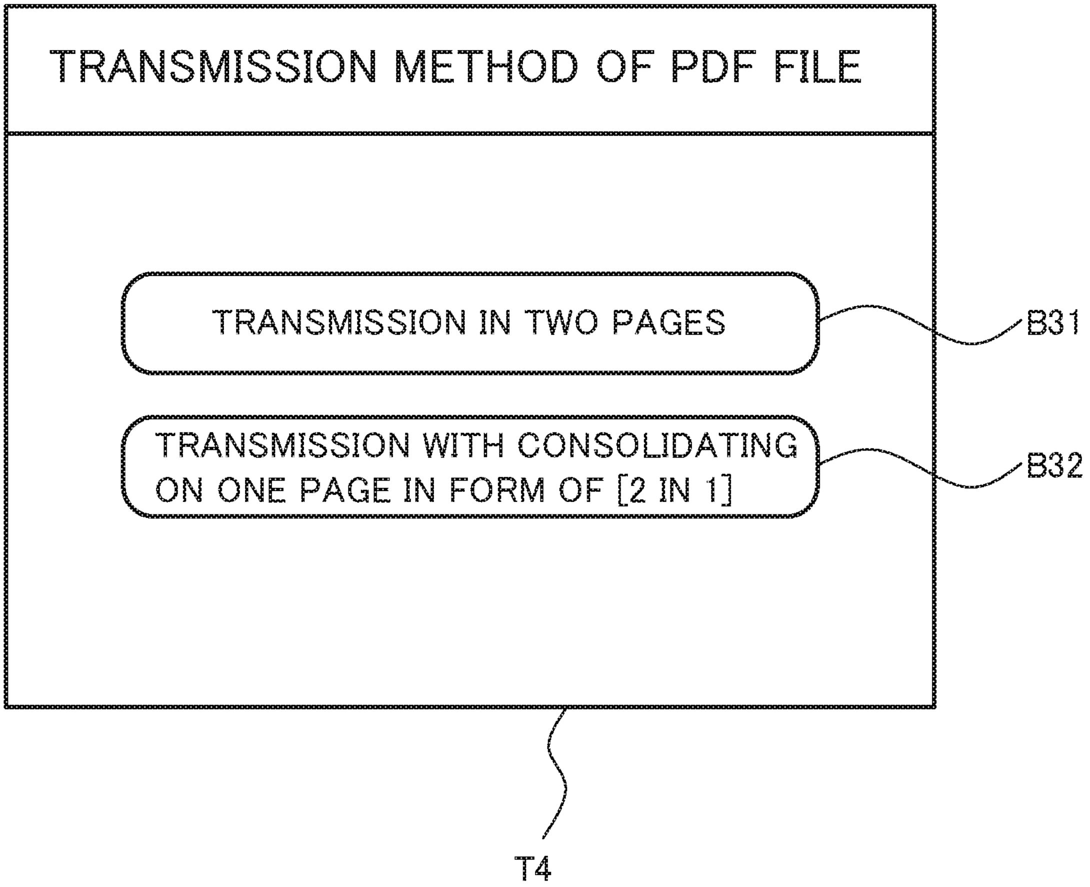
FIG. 11 is a diagram showing an example of the operation screen displayed on the display section.

The control section 100 follows a selection instruction inputted from the user through the operation section 47 and selectively executes either of these (d) and (e). For example, the control section 100 causes the display section 473 to display an operation screen T4 as shown in FIG. 11 so that the user can arbitrarily select the transmission method in accordance with the operation performed on the operation screen T4. The operation screen T4 includes selection buttons B31 and B32 formed thereon: the selection buttons B31 and B32 display "TRANSMISSION IN TWO PAGES" and "TRANSMISSION WITH CONSOLIDATING ON ONE PAGE IN FORM OF [2 IN 1]", respectively.

When accepting operation from the user on either of the selection buttons B31 and B32, the selection acceptance section 102 accepts: based on the operation performed on the selection button B31, the instruction to arrange the both images on two pages and transmit; and based on the operation performed on the selection button B32, the instruction to consolidate the both images into one page in form of [2 in 1] and transmit. The control section 100 transmits the PDF data D2 and the data for transmission to the external device 20 determined in advance through the network interface section 91 in accordance with content of the instructions received by the selection acceptance section 102.

According to the embodiment described above, not only the original image but also the image having the translated text can be output targets for printing and transmission, so that convenience for the user is improved.

In the technique described in the above BACKGROUND, being able to search characters not only in English of the original language but also in Japanese of other language is convenient. However, in the above technique, the image to be obtained in printing a PDF file is the original image (the image showing English, which is the original text, in the above technique) shown in the RAW image data: it is not the image showing the translated text (Japanese in the above technique).

In contrast, in the present embodiment, not only the original image but also the image having the translated text is to be outputted for printing or transmission. This can improve user's convenience.

In addition, in the above embodiment, the RAW image data obtained through the reading by the document reading unit 5 is targeted for processing, but the target is not limited to such the RAW image data. For example, the RAW image data saved on the HDD 92 by reception from the external device 20 (so-called box-saving) may be targeted for processing.

In this case, when no job is being performed by the image forming apparatus 1, the character recognition section 103, the translation section 104, the generating section 105, the synthesizing section 106, and the image processing section 107 may be arranged to perform the processing starting from the character recognition up to the creation of the translated text.

The disclosure is not limited to the foregoing embodiment, but may be modified in various manners. Moreover, although the image processing apparatus 1A according to the foregoing embodiment of the disclosure is exemplified by the multifunction peripheral, the disclosure is equally applicable to different image processing apparatuses having the copy function and scanner function.

Furthermore, the configuration and processing described in the above embodiment with reference to FIGS. 1 to 11 are merely illustrative of the present disclosure and the present disclosure is not intended to be limited to the above configuration and processing.

While the present disclosure has been described in detail with reference to the embodiments thereof, it would be apparent to those skilled in the art the various changes and modifications may be made therein within the scope defined by the appended claims.

What is claimed is:

1. An image processing apparatus comprising:

a character recognition section that performs character recognition processing on image data;

a translation section that translates an original text obtained through the character recognition processing performed by the character recognition section into a predetermined language and creates a translated text;

an image processing section that generates a replaced image in which a text portion of an original image shown in the image data is replaced from the original text by the translated text;

a selection acceptance section that accepts an instruction of selecting, as an output target, either one or both of the original image shown in the image data and the replaced image; and a control section that performs, in accordance with the instruction accepted by the selection acceptance section, processing of outputting an output target image selected as the output target, wherein in replacing the text portion of the original image from the original text by the translated text, the image processing section arranges the translated text at a same arrangement position with the original text, the image processing section enlarges or reduces a character size of the translated text and arranges the translated text at the arrangement position corresponding to the original text, and if the translated text exceeds a range of the arrangement position corresponding to the original text, the image processing section sets the character size of the translated text so that the translated text fits into the range of the arrangement position.

2. An image processing apparatus comprising:

a character recognition section that performs character recognition processing on image data;

a translation section that translates an original text obtained through the character recognition processing performed by the character recognition section into a predetermined language and creates a translated text;

an image processing section that generates a replaced image in which a text portion of an original image shown in the image data is replaced from the original text by the translated text;

a selection acceptance section that accepts an instruction of selecting, as an output target, either one or both of the original image shown in the image data and the replaced image; and a control section that performs, in accordance with the instruction accepted by the selection acceptance section, processing of outputting an output target image selected as the output target, the image processing apparatus further comprising a communication unit that performs data communication with an external device, wherein when the selection acceptance section accepts user selection of selecting the both images as the output target, the image processing section creates the output target image containing the both images on two pages or creates the output target image containing the both images on one page on which the output target image is consolidated in form of 2 in 1, and by transmitting via the communication unit the output target image created by the image processing section to the external device having been determined in advance, the control section performs the processing of outputting.

3. An image forming apparatus comprising:

an image processing apparatus including:

a character recognition section that performs character recognition processing on image data;

a translation section that translates an original text obtained through the character recognition processing performed by the character recognition section into a predetermined language and creates a translated text;

an image processing section that generates a replaced image in which a text portion of an original image shown in the image data is replaced from the original text by the translated text;

a selection acceptance section that accepts an instruction of selecting, as an output target, either one or both of the original image shown in the image data and the replaced image; and a control section that performs, in accordance with the instruction accepted by the selection acceptance section, processing of outputting an output target image selected as the output target; and an image forming unit that forms an image on a recording medium, wherein when the selection acceptance section accepts user selection of selecting the both images as the output target, the image processing section creates print data with respect to any of: simplex printing for two pages under which one of the both images is printed on one page and the other one of the both images is printed on the other page; consolidated printing under which the both images are consolidated into one page in form of 2 in 1; and duplex printing under which one of the both images is arranged at a front side of one page and the other one of the both images is arranged at a back side of the one page, and by causing the image forming unit to form the output target image containing the both images, the control section performs the processing of outputting.

* * * * *